Feb. 5, 1929.  S. SILBERMANN  1,701,278
HIGH TENSION CABLE
Filed June 23, 1924
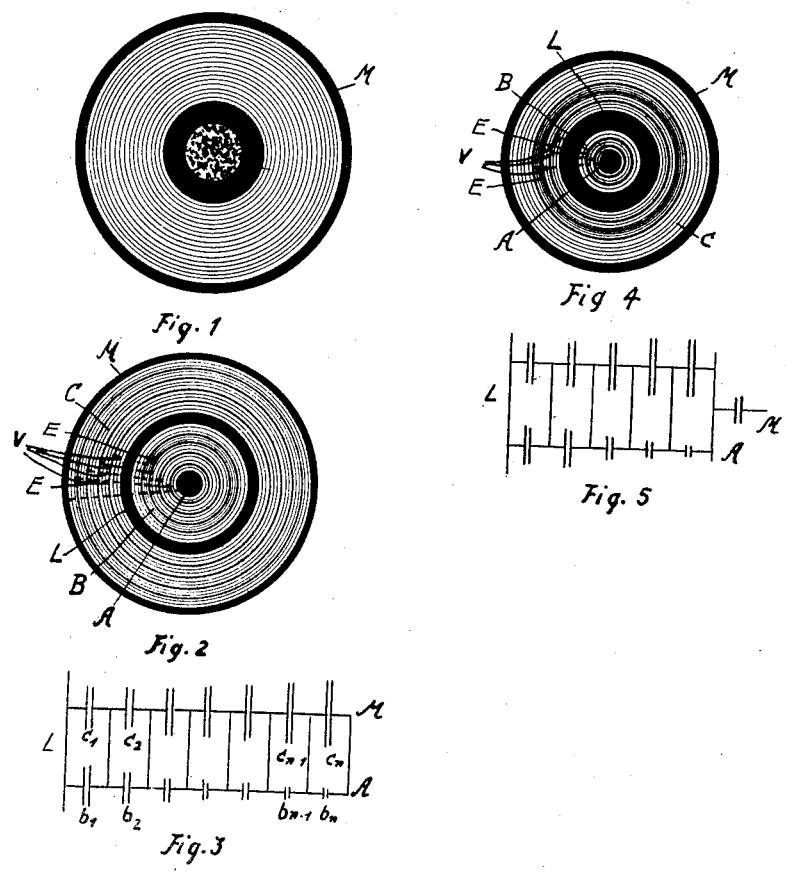
Inventor.
S. Silbermann
by Fr. Dittmar
Attorney.

Patented Feb. 5, 1929.

1,701,278

UNITED STATES PATENT OFFICE.

SALMAN SILBERMANN, OF PORZ-ON-THE-RHINE, GERMANY.

HIGH-TENSION CABLE.

Application filed June 23, 1924, Serial No. 721,931, and in Germany June 30, 1923.

This invention relates to a high-tension cable. In order to attain high tensions in cables proposals have already been made, which involve embedding conducting metallic sheets in the cable insulation and keeping these positively at certain potentials, these sheets being either connected to special tappings led out from transformers, or additional capacities in the form of condenser batteries, the connections being made at the cable ends where the sheets are outside the cable and accessible. In this way a better and more uniform usage of the cable insulation is certainly attained, and very high tensions thus transmitted with small insulation thickness. Such arrangements of cable have, however, achieved no practical importance for the advantage of small cable dimensions gained therewith is quite outweighed by the expenses involved by the provision of extra apparatus such as transformers with special tappings, or large condenser batteries and the constructional apparatus required for housing the latter etc. Further, the metallic sheets must be made correspondingly large in cross section, bearing in mind the very considerable currents which these sheets must carry. High tension cables are naturally only laid in great lengths, and large currents must therefore flow in the sheets forming the partial capacities and the tappings of the transformers or the condenser batteries connected thereto, and consequently there will be additional heating of the dielectric and in consequence thereof a reduction of the efficiency and conductivity of the cable. If a shorter piece of cable is inserted in an aerial line arrangement as for instance at crossings, or if the conductor is taken through thickly populated districts, then such cables are altogether unusable since it is impossible to provide special transformers or condensers for connecting up the sheets for such short pieces of cable.

This invention has for its object among others, to provide a new construction for the production of high tension cables, which allows a considerable reduction in the dimensions of the cable without incurring the above mentioned disadvantages.

Figure 1 is a cross section of a cable of known construction with round shaped conductors.

Figure 2 is a cross section of my improved cable, showing the connections between the metallic layers.

Figure 3 is a diagrammatic view showing the layers in Fig. 2.

Figure 4 is a cross section showing a modified form.

Figure 5 is a diagrammatic view of the construction shown in Figure 4.

It is known that in high tension cables the smallest dimensions are obtained if the total diameter is 2.72 times as great as the conductor diameter. From this it follows that with a given potential difference in the mains and a prescribed maximum allowable electrical stress in the insulation, the diameter of the conductor must be correspondingly large. Since, however, to reduce expense the cross-section of the conductor is made as small as possible having due regard to the current to be carried, an annular cross-section L as shown in Figure 1 is preferably used and the inner space is filled with a suitable material such as jute or the like. According to this invention for cables, as shown in Figure 2, an annular conductor L is likewise chosen. The inner space of this conductor L is however filled with material of a high insulating value, in which metallic sheets are embedded. The cable insulation C is also provided with metallic sheets, as shown in Figure 2. In this figure: A indicates an additional conductor of small cross-section of cheaper material such as iron etc., B and C the cable insulation with conducting sheets embedded therein, L is the annular main conductor, E are the metallic layers, M is the earthed casing (lead or the like) and V the connections between the sheets.

The electrical connections between the sheets are shown diagrammatically in Figure 3. These connections are made only on the outside of the cable, that is at the beginning and end of the cable and at the junction boxes or like accessible places. The sheets are for example so arranged that the layer thicknesses of the partial layers or capacities produced by the sheets are all of the same magnitude. If the single partial layers of the insulation B in the direction from L to A are indicated by $b_1, b_2 \ldots b_n$ and the partial capacities of the insulation C in the direction from L to M by $c_1, c_2 \ldots c_n$ (see also Figure 3) then it is immediately obvious, taking a large number of corresponding thin layers, that $$b_1 + c_1 = b_2 + c_2 \ldots = b_n + c_n.$$

The combined partial capacities then are all of the same magnitude and therefore each of them has the same partial tension, from which it follows that the average electrical stresses of the single layers of insulation in the whole cable insulation, thus as in B as well as in C, are practically the same. The same consideration also prevails for the same reason if the different layer strengths are not chosen of the same strength or the number of layers is made small, etc. The tension distribution, which is dependent upon the partial layers, can always be so arranged that the desired maximum allowable local stresses are not exceeded. Therefore although in such a cable the conductor L must be to a certain extent twice insulated from earth, from A and from M it can be produced with essentially smaller dimensions than an ordinary cable. Merely breaking the cable insulation into three partial capacities will allow a considerable decrease in the overall cable diameter, and the use of a large number of partial capacities, (more metallic layers) will allow greater decrease in diameter.

The condenser cable has further the advantage that the conductor cross-section need not be absolutely circular as has hitherto been necessitated by consideration of field distribution, but can take any desired form. With cables for use at a low tension with a view to saving space, the conductor section is often made sector shaped; with higher tensions, however, such a section has not been admissible for the stress of the insulation material would be too great in the neighbourhood of the tapered edges of the conductor. In the condenser cable in consequence of the positively distributed stresses such a high stress cannot occur. Therefore with this cable even a sector shaped cross-section may be chosen, by which means the cable dimensions can be even further reduced.

So as to be better able to impregnate the cable the sheets to be enclosed are pierced through at many points, preferably by pin holes. Finally, instead of sheets, fabric of the finest electrically conducting threads can be used.

What I claim is:—

1. A high tension cable with conducting sheets embedded in the insulation forming partial capacities, characterized by the feature than an additional capacity is connected in parallel with each partial capacity for equalizing the partial capacities, said additional capacities being formed in the cable itself.

2. High tension cable according to claim 1, characterized by the feature that the cable conductor is made tubular, the space within which likewise contains insulation provided with conducting sheets for the purpose of forming the additional capacities for the partial capacities of the main insulation.

3. High tension cable according to claim 1, characterized by the feature that only a part of the partial capacities contained in the main insulation are equalized by the additional capacities.

4. High tension cable according to claim 1, characterized by the feature that owing to the positive distribution of the electrical stress in the insulation the cross-section of the conductor is other than circular.

In testimony whereof I hereunto affix my signature.

SALMAN SILBERMANN.